Jan. 15, 1963    H. H. HOGE    3,074,031
MAGNETICALLY CONTROLLED SWITCHING CIRCUIT
Filed May 9, 1961

3,074,031
MAGNETICALLY CONTROLLED SWITCHING
CIRCUIT
Henri H. Hoge, Baltimore, Md., assignor to The Hoover
Company, North Canton, Ohio, a corporation of Ohio
Filed May 9, 1961, Ser. No. 108,889
12 Claims. (Cl. 331—113)

The present invention relates generally to magnetically controlled transistor switching circuits and particularly to circuits which are controlled by so-called square hysteresis loop saturable cores.

It is an object of my invention to provide a magnetically controlled switching circuit particularly useful for producing a square wave A.C. output for use as such or as the input to a rectifier in a D.C. to D.C. converter wherein the maximum potential drop across the windings on the saturable core is held to a very low value relative to the source of potential.

It is a further object of the invention to provide circuits of the above character constructed to isolate the saturable core from the power circuit and the source potential whereby the A.C. frequency is substantially independent of variations in source potential and is determined by the saturable core and its associated windings. The arrangement is such that it permits the use of a small core having a low volt-second product energized by a small winding which is subjected to a small potential to magnetize the core.

It is a further object of my invention to provide a magnetically controlled switching circuit including power transistors and having a diode series connected in the load circuit shunted by a winding placed on a tape wound square loop saturable core and arranged to control one or more transistors by biasing selected transistors into the conducting state and other transistors into the non-conducting state by transformer action through other windings placed on the core.

Figure 2:
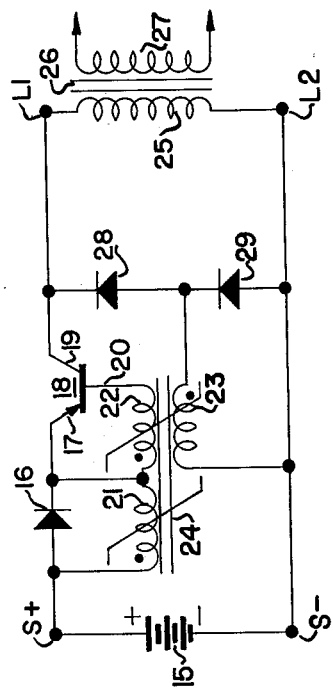
Figure 4:
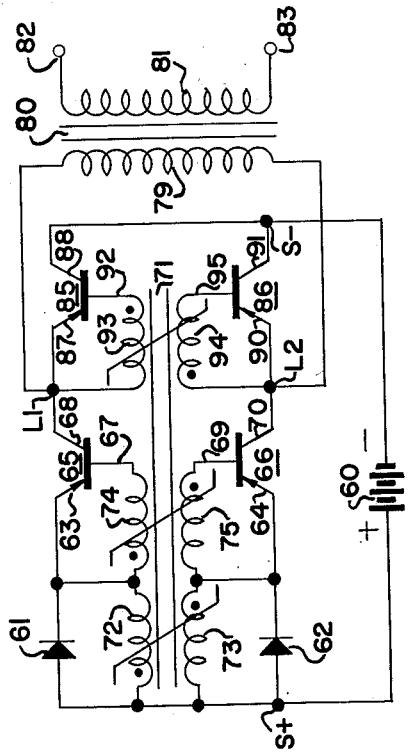
Figure 1:
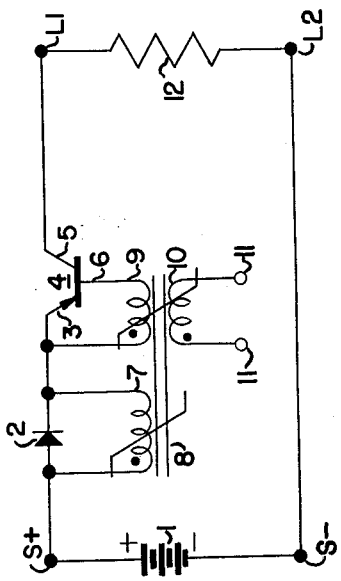
Figure 3:
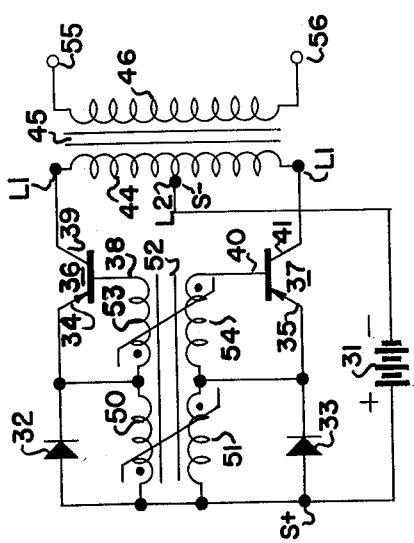

Other additional objects and advantages of the invention will become apparent as the description proceeds when taken in connection with the accompanying drawing wherein FIG. 1 illustrates one circuit in accordance with my invention in which a single transistor is alternately switched on and off to apply intermittent pulses to a load and including a resetting winding energized from an external source, FIG. 2 illustrates a form of my invention connected to an inductive load and including internal circuitry for resetting the core at the termination of each conducting period of the transistor, FIG. 3 illustrates a form of my invention as it may be utilized to produce a square wave A.C. output, and FIG. 4 illustrates a still further development of my invention showing an arrangement in a bridge circuit in which the power transistors are protected from the effects of any voltage greater than the source voltage.

Referring now particularly to FIG. 1, the circuit therein illustrated is energized by a source of D.C. potential, such as a battery 1. In all illustrated modifications of my invention the energizing source has its positive and negative terminals connected to energizing terminals S+ and S— respectively. Terminal S+ is connected through a diode 2 to the emitter 3 of a power transistor 4 which has collector and base electrodes 5 and 6, respectively. The diode 2 is poled to conduct to the emitter 3 and is shunted by a magnetizing winding 7 wound upon a tape wound magnetic core 8 of the square loop saturable type. A driving winding 9 on the core 8 is connected between the base and emitter electrodes of transistor 4. A reset winding 10 is also wound upon the core 8 and has terminals 11 which may be connected to any suitable source of timing pulses for resetting the core 8.

In all modifications of my invention illustrated in the drawing terminals $L_1$ and $L_2$ are provided for connection to a load. In FIG. 1 terminal $L_1$ is connected to the collector 5 and one end of a load here shown as a resistance 12. The terminal $L_2$ is common (or connected) to terminal S— and the other end of load resistance 12.

As shown in the drawing, the dotted ends of each winding on the core have the same instantaneous polarity. For convenience herein, it is assumed that positive current entering the dotted end of a winding magnetizes the core positively.

The winding 7 is driven by the diode 2 and forms a potential source, the impedance of which is the slope of the forward conducting diode characteristic.

When the transistor 4 starts to conduct, magnetizing current flows through the winding 7 to magnetize the core 8. The transformer coupling between windings 7 and 9 through core 8 induces a potential in winding 9 which biases the transistor 4 to saturation. Winding 10 is also transformer coupled to winding 7 but is inactive at this time.

As the core saturates, the rate of change of magnetic flux in this circuit approaches zero and substantially the full load current then flows in the winding 7 which offers only its D.C. resistance to current flow at this time.

When the core saturates, a reverse potential is induced in the windings 7 and 9 which reverse biases the diode 2 and biases the transistor 4 to cut-off.

At the conclusion of each conducting cycle the winding 10 is energized from a suitable timed source to reset the core 8 for repetition of the previously described cycle.

Current flows in winding 10 from the external source in a direction to magnetize, reset, core 8 with a polarity opposite to that induced therein by magnetizing winding 7. During the period of external energization of winding 10, the potentials induced in windings 7 and 9 are opposite to the potentials in these windings produced when energized from the source 1, hence, the diode 2 and transistor are each biased to cut-off. Upon reverse saturation of core 8 at the termination of the reset pulse in winding 10 reverse potentials are again induced in windings 7 and 9 which bias diode 2 and transistor 4 into conduction to start a new power pulse to load 12.

The load 12 receives spaced pulses of current which essentially equal the positive potential of the source 1, interrupted by periods of non-conduction when the transistor 4 is shut off and the winding 10 is resetting the core 8.

The potential across winding 7 is only of the order of approximately one volt. Similarly, the potential developed across winding 9 is of the same order of magnitude to provide a biasing potential to the base electrode 6 of the transistor 4. The number of turns on the windings 7 and 9 is determined by the volt-second product of the core in view of the potentials provided by the particular diode 2 and transistor 4 which are utilized in any given circuit and the period of conduction which it is desired to provide for transistor 4. Consequently, the windings and core may be comparatively small as they are never called upon to withstand voltages of the order of the source 1. The winding 10 may conveniently be of the same number of turns as windings 7 and 9, for example, or it may have a different number of turns if in a particular application it is desired that the reset period have a different time period from the conducting period.

Referring now to FIG. 2, there is illustrated a modified circuit for supplying an inductive load. In this arrangement a D.C. power source 15 has its terminals connected through terminals S+ and S—. Terminal S+ connects to a diode 16 poled to conduct to the emitter electrode 17 of a transistor 18 having a collector electrode 19 and a base electrode 20. A magnetizing winding 21 is shunted around diode 16 and a biasing winding 22 is connected between the base electrode 20 of the transistor and the junction between diode 16 and emitter electrode 17. A core resetting winding 23, corresponding to the winding 10 of FIG. 1, and the windings 21 and 22 are wound on a tape wound saturable core 24. The collector electrode 19 of the transistor 18 is connected to the load terminal $L_1$ which is also connected to the upper end of the primary winding 25 of a transformer 26 having a secondary 27 which may be connected in any suitable way to an ultimate power consuming device. The lower end of the transformer winding 25 is connected to the terminal $L_2$ which is common with or connected to terminal S—. Diodes 28 and 29 are series connected across the terminals $L_1$ and $L_2$ and hence the transformer primary 25 and are poled to block flow of current from the collector 19 to the negative terminal of the source 15 and to conduct readily if the polarity of the winding 25 should become reversed. The winding 23, which is the reset winding for the saturable core 24, has one terminal connected between the diodes 28 and 29 and one terminal connected to the negative terminal of the source 15.

In this circuit, assuming as a starting point that a connection has just been established to the source 15, conduction begins and current flows through winding 21 in an amount determined by the potential drop across the diode 16. This current magnetizes the core 24 and also by transformer action through the winding 22 biases transistor 18 to saturation.

As before, saturation of the core 24 results in reverse potentials across windings 21 and 22 which cut off the diode 16 and transistor 18. The consequent reduction of current flow through the winding 25 and collapse of the magnetic field of the transformer 26 induces a reverse potential on the winding 25 causing current to flow from the terminal $L_2$ through diodes 29 and 28 to the terminal $L_1$. The reset winding 23 is now driven by the forward conducting impedance of diode 29 and resets the core 24; that is, it is saturated in the opposite polarity. While the winding 23 is resetting core 24 the potentials induced in windings 21 and 22 by transformer action are polarized oppositely to their polarization during the conducting phase of operation of the transistor 18 and they serve to back bias the diode 16 and to bias transistor 18 to cut-off. When core 24 reaches saturation in its reverse polarity under the drive of winding 23, the rate of change of flux across windings 21 and 22 decreases to zero and reversed potentials induced therein in their normal conducting direction initiates a new conducting cycle of the transistor.

In this circuit the potential induced in reset winding 23 when transistor 18 is conducting is such as to back bias diode 29 while diode 28 is back biased by the potential of collector 18, hence, there is no current flow in winding 23 at this time.

In the circuit of FIG. 2 it will be observed that the energy stored in the magnetic field of the load transformer is in part recaptured by the winding 23 and utilized to reset the core. Further, the entire time cycle of the operation is determined solely by the core 24 and its associated windings 21 and 23 and no outside timing source need be provided.

If desired, additional impedance in the form of resistances may be inserted in the circuit, including the diodes 28 and 29 to regulate the maximum voltage to which the winding 23 is subjected and to determine the duration of the reset period.

Referring to FIG. 3, there is illustrated a form of my invention particularly adapted for use in an inverter circuit to feed a rectifying device for D.C. to D.C. conversion or as a square wave A.C. source.

In FIG. 3 the source 31 is connected to terminals S+ and S— which are connected to the anodes of diodes 32 and 33 the cathodes of which are respectively connected to emitter electrodes 34 and 35 of transistors 36 and 37. Transistor 36 is also provided with a base electrode 38 and a collector electrode 39. Transistor 37 is also provided with a base electrode 40 and a collector electrode 41. The collector electrodes 39 and 41 are respectively connected to separate terminals $L_1$ and $L_1$ which connect to the primary 44 of a transformer 45, having a secondary winding 46. A center tap on the winding 44 is the common $L_2$ and S— terminal of this circuit. The diodes 32 and 33 are respectively shunted by magnetizing windings 50 and 51 wound upon a square loop saturable tape wound core 52. The saturable core also includes transistor biasing or driving windings 53 and 54 which are respectively connected across the base and emitter electrodes of transistors 36 and 37. The output of the transformer winding 46 is taken from the terminals 55 and 56 thereof and may be applied to any suitable load.

Assuming that the source 31 is initially connected as shown and that the transistor 36 begins conduction more heavily than transistor 37, the current flow through winding 50 will, by transformer action, bias transistor 36 in the conducting direction and bias transistor 37 to cut-off and reverse biasing diode 33 after which the current flow through winding 50 will increase the magnetization of the core 52 linearly until saturation during which period of time the transistor 36 will be biased to saturation by the potential induced in winding 53 and transistor 37 will be biased to cut-off by the potential induced in winding 54. After saturation of the core 52 the rate of change of magnetization approaches zero, removing the biasing potential from base 38 and removing the cut-off bias from base 40. The reverse potentials produced across the various windings associated with the core 52 at this time are polarized to bias transistor 36 to cut-off and to bias transistor 37 to saturation, at the same time putting a reverse bias across diode 32 and biasing diode 33 in the conducting direction, whereupon the winding 51 becomes the energizing winding for the core 52. Winding 51 magnetizes the core 52 to saturation with a polarity reversed from that produced when the core was magnetized by the winding 50 and continues until the core is saturated after which a reversal process occurs as above described.

The maximum current which can flow in the magnetizing windings 50 and 51 is the load current of the transformer primary 44 and even this current is present only for a short period of time immediately following saturation of the magnetic core.

Since the core is alternately set to opposite polarities by the magnetizing windings 50 and 51 there is no necessity for a separate reset winding such as that described in connection with FIGS. 1 and 2. This function in effect being served alternately by the windings 50 and 51 as they take the core from one condition of magnetization to its opposite condition of magnetization.

It will be observed that in a device such as that illustrated in FIG. 3 the off transistor may be subjected to a potential equal to twice the potential of the source 31 because of the center tap arrangement in transformer 45. FIG. 4 illustrates a circuit devised to prevent potential stress on any transistor in excess of the potential of the source.

Referring now to FIG. 4 there is illustrated a device similar to that illustrated in FIG. 3 wherein the transformer is part of a bridge circuit. The potential source 60 is connected to terminals S+ and S— which are connected respectively to the anodes of diodes 61 and 62 which in turn have their cathodes connected to the emitter electrodes 63 and 64 of transistors 65 and 66, respectively. The transistor 65 also includes a base electrode 67 and a collector electrode 68. The transistor 66 has a base electrode 69 and a collector electrode 70. A tape wound, square loop saturable transformer core 71 is provided with magnetizing windings 72 and 73 which are connected in shunt to the diodes 61 and 62, respectively. Biasing windings 74 and 75 on the core 71 are connected between the base and emitter electrodes of transistors 65 and 66, respectively. The collector electrodes 68 and 70 of transistors 67 and 66 are connected to the terminals $L_1$ and $L_2$ connected to opposite ends of the primary winding 79 of transformer 80. The transformer 80 has an output winding 81 having terminals 82 and 83 which may be connected to any suitable or desired load.

An additional pair of transistors 85 and 86 are provided to complete the bridge circuit. The transistor 85 has an emitter electrode 87 connected to the terminal $L_1$. Collector electrode 88 of transistor 85 is connected to terminal S—.

The transistor 86 has an emitter electrode 90 connected to terminal $L_2$ and a collector electrode 91 connected to terminal S—. The base electrode 92 of transistor 85 is connected to the emitter of that transistor through a winding 93 also wound on the core 71. Similarly, transistor 86 has a base electrode 95 connected to its emitter electrode 90 through a winding 94 also wound on the core 71.

Assuming that transistor 65 begins to conduct the magnetizing winding 72 will have current flow therethrough and will induce a potential in winding 74 to bias transistor 65 to saturation. It will also similarly bias driving winding 94 and will bias transistor 86 to saturation. The potentials of the induced voltages in windings 73, 75 and 93 will be such as to reverse bias diode 62 and cut-off transistors 66 and 85.

Under the conditions assumed immediately above, current flow will be from the terminal S+ through diode 61, the emitter collector path of transistor 65, terminal $L_1$, primary winding 79, terminal $L_2$, the emitter collector path of transistor 86 and thence to terminal S—. After saturation of the core 71 by the magnetizing windings 72, the reverse biases then induced across the various windings on the core will bias transistors 65 and 86 to cut-off and bias transistors 66 and 85 into conduction as well as reversely biasing diode 61, following which the current flow through magnetizing windings 73 will magnetize the core, driving it in accordance with the volt-second rating thereof to saturation in the reverse direction. During this period of conduction the current flow path is from terminal S+ through diode 62, the emitter collector path of transistor 66, terminal $L_2$, primary windings 79, terminal $L_1$, the emitter collector path of transistor 85 and thence to the terminal S—. After saturation of the core in the reverse direction, the various potentials produced in the windings associated with the core are reversed and conduction is then returned to the path originally described.

In this circuit arrangement it will be noted that no transistor is ever subjected to a potential in excess of the potential of the source 60 and this circuit is particularly useful for providing inverters or D.C. to D.C. converter drives with comparatively low-cost transistors because of the limited potential which they are called upon to withstand in the off condition.

Throughout the disclosures set forth above, the sensing diodes and their associated magnetizing windings have been illustrated as being positioned between the positive terminal of the source and the emitter electrodes of the transistors. This arrangement is not mandatory as the diodes and their associated magnetizing windings may as readily be placed in the collector circuit between the collectors and the collector connections to the transformer windings or at any point in the power circuit. This is primarily a matter of designer's choice as may be determined by the requirements of physical layout of components.

Though PNP transistors have been shown throughout, the invention is equally useful with NPN transistors with the necessary changes in polarities as will be apparent to those skilled in the art.

It is a characteristic of the various forms of the invention hereinabove described that the saturable core is divorced from the power circuit and, hence, may be made of small size and be very economical. Additionally, the potentials applied to the various core windings are of a low order and are essentially independent of the source voltage. This permits the use of small, low-cost windings which are not called upon to withstand high stresses and permits the frequency of the device to be determined not by the source potential but by the characteristics of the core and its associated diode magnetizing winding circuit.

In all cases the potential applied to the magnetizing and reset (except in FIG. 1) windings is always determined by the forward conducting characteristic of a diode which provides voltage drive for the magnetizing or reset winding as the case may be. Due to the high impedance of these windings when magnetizing the core, the current flow therethrough is limited and, in any case, the load current is the maximum current which they will be called upon to carry. This, however, is a minor consideration as the load current will flow through magnetizing or reset windings only for the extremely short period of time elapsing between saturation of the core and the development of a reverse potential across the winding.

While I have illustrated and described the invention in considerable detail, it is understood that various changes may be made in the arrangement of components without departing from the spirit of the invention or the scope of the appended claims.

I claim:

1. A switching circuit comprising a transistor having base, emitter and collector electrodes, a diode, a power circuit including said collector-emitter electrodes and diode in series with the diode poled to conduct forwardly when the transistor is conducting, a square loop saturable transformer core, a first magnetizing winding on said core connected in shunt to said diode, a biasing winding on said core connected between the base of the transistor and said series circuit, a second magnetizing winding on said core, said magnetizing windings being arranged when energized to magnetize said core in opposite senses and said biasing winding being arranged to bias said transistor toward saturation when said first magnetizing winding is energized and toward cut-off when said second magnetizing winding is energized.

2. A switching circuit according to claim 1 wherein said second magnetizing winding is periodically energized from an external source of periodic potential pulses.

3. A switching circuit according to claim 1 wherein said power circuit includes an inductive load, a pair of diodes are series connected across at least a portion of said inductive load and are poled to block flow of current when said transistor is conducting and said second magnetizing winding is connected in shunt to one of said pair of diodes.

4. A switching circuit according to claim 1 including a second transistor having base, collector and emitter electrodes, a second diode, a second power circuit including the emitter and collector electrodes and said second diode in series circuit with said second magnetizing winding connected in shunt to said second diode and a second biasing winding on said core connected between the base electrode of said second transistor and said second power circuit, said second biasing winding being arranged to bias said second transistor toward cut-off and saturation when said first and second magnetizing are respectively magnetizing said core.

5. A magnetically controlled switching circuit comprising a first pair of terminals adapted to be connected to a load, a second pair of terminals adapted to be connected to a source of D.C. potential, a pair of transistors each having base, emitter and collector electrodes, a pair of diodes, means forming a pair of power circuits each including said terminals and the emitter and collector electrodes of one of said transistors and one of said diodes in series circuit relation with each diode poled to conduct forwardly when its associated transistor is conducting, a square loop saturable transformer core, a first pair of magnetizing windings on said core arranged to magnetize said core in opposite senses and each connected in shunt to a separate one of said diodes, a pair of biasing windings on said core each associated with a separate one of said transistors and each connected between the base and one of the other electrodes of its associated transistor, said biasing windings each being arranged to bias its associated transistor toward saturation when said core is being magnetized by the magnetizing winding in shunt to the diode in series with said associated transistor.

6. Magnetically controlled switching circuit comprising first and second power circuits, means for connecting each of said power circuits to a D.C. source, a pair of transistors each having base, collector and emitter electrodes, a pair of diodes, each of said power circuits including the one of said diodes and the emitter collector path of one of said transistors, a square loop saturable core, a pair of magentizing windings on said core each connected in shunt to a separate one of said diodes and arranged to magnetize said core in opposite senses, a pair of biasing windings on said core each connected to the base and one other electrode of a separate one of said transistors, said biasing windings each being arranged to bias the transistor to which it is connected toward saturation when the core is being magnetized by the magnetizing winding connected to the power circuit including the transistor to which the biasing winding is connected.

7. Apparatus according to claim 6 having a terminal in each of said power circuits for connection to a load, a second pair of power transistors each having base, emitter and collector electrodes having their emitter collector paths series connected across said load terminals and their junction connected to said D.C. source, a second pair of biasing windings on said core each connected to the base and one other electrode of a separate one of said second pair of transistors, said second pair of biasing windings each being arranged to bias the transistor to which it is connected toward saturation when the transistor of the first pair thereof in the power circuit including the same load terminal is cut-off.

8. A magnetically controlled switching circuit including a pair of transistors each having a base, an emitter and a collector, a pair of diodes, a pair of terminals, a pair of parallel connected power circuits each including a separate one of said diodes and the emitter collector path of a separate one of said transistors and a separate one of said terminals in series circuit relation, impedance means connected between said terminals, means for connecting a D.C. power source to a mid point of said impedance means and in series with the parallel power circuits, a square loop saturable core, a pair of magnetizing windings on said core each connected in shunt to separate ones of said diodes, a pair of biasing windings on said core each connected between the base and another electrode of separate ones of said transistors, said magnetizing windings being arranged to magnetize said core in opposite senses, and each biasing winding being arranged to bias the transistor to which it is connected toward saturation when the core is magnetized by the winding in shunt to the diode in the same power circuit as such transistor.

9. Apparatus according to claim 8 wherein said impedance means comprises the primary of a load transformer.

10. Apparatus according to claim 8 wherein said impedance means includes the emitter collector paths connected in series of a second pair of transistors each having base, emitter and collector electrodes, and including a second pair of biasing windings on said core each connected to the base and another electrode of a separate one of said second pair of transistors, each of said second pair of biasing windings being arranged to bias the transistor to which it is connected toward saturation when the power circuit containing the terminal to which such transistor is connected is opened by transistor in such power circuit.

11. A magnetically controlled switching circuit including a pair of power circuits arranged in parallel terminating in a common load member connected at its opposite ends to said power circuits, means for connecting one terminal of a D.C. source to a mid point of said common load member and the other terminal thereof to said power circuits, a pair of transistors each having base, emitter and collector electrodes, a pair of diodes, each of said power circuits having a separate one of said diodes and the emitter collector path of a separate one of said transistors connected in series, a square loop saturable core, a pair of magnetizing windings on said core each connected in shunt with a separate one of said diodes, a pair of biasing windings on said core each connected between the base and one other electrode of separate ones of said transistors.

12. A magnetically controlled switching circuit adapted for connection to a source of direct current comprising a transistor having base, emitter and control electrodes, a sensing diode, means for establishing a series circuit including the collector emitter path of said transistor, the said diode, a load and a D.C. source, a transformer core of the square loop saturable type, magnetizing winding on said core connected in shunt to said diode, a biasing winding on said core connected between the base and one other electrode of said transistor and a further winding on said core adapted to be connected to a source of reset pulses for resetting the core with a polarity opposite to the polarity thereof when magnetized by said magnetizing winding.

No references cited.